United States Patent
Lamola et al.

(10) Patent No.: US 6,787,601 B2
(45) Date of Patent: Sep. 7, 2004

(54) POLYMER SYNTHESIS

(75) Inventors: Angelo A. Lamola, Worcester, PA (US); Robert M. Blankenship, Harleysville, PA (US)

(73) Assignee: Shipley Company, L.L.C., Marlborough, MA (US)

( * ) Notice: Subject to any disclaimer, the term of this patent is extended or adjusted under 35 U.S.C. 154(b) by 287 days.

(21) Appl. No.: 09/960,680

(22) Filed: Sep. 22, 2001

(65) Prior Publication Data

US 2002/0173587 A1 Nov. 21, 2002

Related U.S. Application Data

(60) Provisional application No. 60/278,906, filed on Mar. 26, 2001.

(51) Int. Cl.⁷ .................................................. C08K 5/16
(52) U.S. Cl. ....................................... 524/714; 524/847
(58) Field of Search .................................. 524/714, 847

(56) References Cited

U.S. PATENT DOCUMENTS 5,502,105 A    3/1996   Revis
5,504,149 A  * 4/1996   Kosal .......................... 524/837
6,420,441 B1   7/2002   Allen et al.

FOREIGN PATENT DOCUMENTS

WO    WO 9324534 A1    12/1993

OTHER PUBLICATIONS

Antonietti et al., "Synthesis and Size Control of Polystyrene Latices via Polymerization in Microemulsion", Macromolecules 1999, 24, pp. 6636–6643.

Pilcher et al., "Structures and Properties of Poly (methyl methacrylate) Latexes Formed in Microemulsions", Macromolecules 1998, 31, pp. 3454–3460.

Ming et al., "High solids–content nanosize polymer latexes made by microemulsion polymerization", Macromol. Chem. Phys. 199, pp. 1075–1079 (1998).

* cited by examiner

*Primary Examiner*—William K. Cheung
(74) *Attorney, Agent, or Firm*—S. Matthew Cairns

(57) ABSTRACT

Disclosed is a method of preparing emulsion polymers and a method of preparing porous dielectric materials using the emulsion polymers.

10 Claims, No Drawings

POLYMER SYNTHESIS

This application claims the benefit of U.S. Provisional Application No. 60/278,906, filed on Mar. 26, 2001.

BACKGROUND OF THE INVENTION

The present invention relates generally to the field of polymer synthesis. In particular, the present invention relates to the field of emulsion polymer synthesis.

Polymers have been prepared by a variety of means such as solution polymerization and emulsion polymerization. Emulsion polymerization is advantageous in that polymer particles having small particle sizes and particle size polydispersities approaching 1 can be prepared. Typically, such emulsion polymerizations are performed using ionic surfactants.

For many polymer applications, such as paints, ionic surfactants used during emulsion polymerization pose no problems. However, for other applications, such as those in the electronics industry, such ionic surfactants are problematic.

One application of polymers in the electronics industry is in the formation of porous interlayer dielectric materials used in the manufacture of integrated circuits. As electronic devices become smaller, there is a continuing desire in the electronics industry to increase the circuit density in electronic components, e.g., integrated circuits, circuit boards, multichip modules, chip test devices, and the like without degrading electrical performance, e.g., crosstalk or capacitive coupling, and also to increase the speed of signal propagation in these components. One method of accomplishing these goals is to reduce the dielectric constant of the interlayer, or intermetal, insulating material used in the components. A method for reducing the dielectric constant of such interlayer, or intermetal, insulating material is to incorporate within the insulating film very small, uniformly dispersed pores or voids. Preferred are pores or voids having a diameter of less than or equal to 100 nm.

One known process of making a porous dielectric involves dispersing thermally removable solid particles, i.e. porogens, in a B-staged dielectric precursor, polymerizing the dielectric precursor without substantially removing the particles, followed by heating the dielectric material to substantially remove the particles and thereby leaving voids or free spaces in the dielectric material. Such voids reduce the dielectric constant of the dielectric material. See, for example, U.S. Pat. No. 5,895,263 (Carter et al.).

Emulsion particles are particularly suited for preparing porous dielectric materials due to their controlled particle size range and narrow particle size distribution. See, for example, Antonietti et al., *Synthesis and Size Control of Polystyrene Latices via Polymerization in Microemulsion, Macromolecules,* vol. 24, 1991, pp 6636–6643. One problem with such decomposable polymer approach is that some of the polymeric material may remain in the pores after the polymers have been removed. This is particularly true of ionic material which is typically less volatile and more likely to remain in the pores. As the dielectric layers become smaller, the presence of even small amounts of ionic material can lead to cross-talk or shorts. Thus, conventional emulsion polymers, prepared with an ionic surfactant, are not suitable for use in the manufacture of porous dielectric materials.

While other methods of preparing porous dielectric materials are known, they suffer from broad distributions of pore sizes, too large pore size, such as greater than 20 microns, or technologies that are too expensive for commercial use, such as liquid extractions under supercritical conditions.

It is known that ionic surfactants can be removed from small emulsion polymer particles by treatment with ion-exchange resins or by successive washing of the isolated particles as described by Krieger. However, these approaches are cumbersome and time consuming.

Emulsion polymerizations using only ethoxylated alcohol surfactants, a nonionic surfactant, are known. Such emulsion polymerizations are typically inefficient, requiring high soap levels and low solids content. The particles produced by such polymerizations have a particle size in the range of several hundreds of nanometers. U.S. Pat. No. 5,502,105 (Revis) discloses a method of making a silicone emulsion by dispersing a siloxane in water by forming a mixture of water, a cyclic siloxane and an ethoxylated alcohol nonionic surfactant; adding an organosilanolate polymerization initiator, and heating the mixture to polymerize the cyclic siloxane. This patent does not disclosed cross-linked emulsion particles.

There is thus a need for a method of producing cross-linked emulsion polymer particles that are substantially free of ionic surfactants, particularly for use in electronics applications, and do not require extensive post polymerization treatments.

SUMMARY OF THE INVENTION

It has been surprisingly found that emulsion polymers having small particle sizes can be prepared in a non-ionic surfactant. Non-ionic surfactants are surprisingly capable of producing extremely small polymer particles less than 100 nm in size. Such polymers have a much lower level of ionic contaminants than conventionally produced emulsion polymers.

In one aspect, the present invention provides a process for preparing polymer particles including the step of: polymerizing one or more monomers in an aqueous emulsion including one or more surfactants, the one or more surfactants consisting of nonionic surfactants, wherein at least one of the nonionic surfactants is an amine-N-oxide surfactant, and wherein the polymer particles have a mean particle size of less than or equal to 100 nm.

In a second aspect, the present invention provides an emulsion of polymer particles including one or more surfactants, the one or more surfactants consisting of nonionic surfactants, wherein at least one of the nonionic surfactants is an amine-N-oxide surfactant, and wherein the polymer particles have a mean particle size of less than or equal to 100 nm.

In a third aspect, the present invention provides an emulsion of polymer particles including one or more surfactants, wherein the polymer particles have a mean particle size of less than or equal to 100 nm, and wherein the emulsion is substantially free of ionic surfactants.

In a fourth aspect, the present invention provides a composition including a B-staged dielectric material and an emulsion polymeric porogen particle wherein the polymer particles have a mean particle size of less than or equal to 100 nm, and wherein the polymer particles are substantially free of ionic surfactants.

In a fifth aspect, the present invention provides a method of manufacturing an electronic device including the steps of: a) depositing on a substrate a layer of a composition including B-staged dielectric material having a plurality of emulsion polymeric porogen particles dispersed therein, wherein the porogen particles have a mean particle size of less than or equal to 100 nm, and wherein the porogen particles are substantially free of ionic surfactants; b) curing the B-staged dielectric material to form a dielectric matrix material without substantially removing the porogen particles; c) subjecting the dielectric matrix material to conditions which at least partially remove the porogen particles to form a porous dielectric material layer without substantially degrading the dielectric material; d) patterning the dielectric layer; e) depositing a metallic film onto the patterned dielectric layer; and f) planarizing the film to form an electronic device.

DETAILED DESCRIPTION OF THE INVENTION

As used throughout this specification, the following abbreviations shall have the following meanings, unless the context clearly indicates otherwise: ° C.=degrees centigrade; nm=nanometer; g=gram; wt %=weight percent; L=liter; mL=milliliter; w/w=weight per weight basis; SLS=sodium lauryl sulfate; ALS=ammonium lauryl sulfate; A-MSTY= alpha-methylstyrene; and MMA=methyl methacrylate.

The term "(meth)acrylic" includes both acrylic and methacrylic and the term "(meth)acrylate" includes both acrylate and methacrylate. Likewise, the term "(meth)acrylamide" refers to both acrylamide and methacrylamide. "Alkyl" includes straight chain, branched and cyclic alkyl groups. The term "porogen" refers to a pore forming material, that is a polymeric material or particle dispersed in a dielectric material that is subsequently removed to yield pores, voids or free volume in the dielectric material. Thus, the terms "removable porogen," "removable polymer" and "removable particle" are used interchangeably throughout this specification. The terms "pore," "void" and "free volume" are used interchangeably throughout this specification. "Cross-linker" and "cross-linking agent" are used interchangeably throughout this specification. "Polymer" refers to polymers and oligomers. The term "polymer" also includes homopolymers and copolymers. The terms "oligomer" and "oligomeric" refer to dimers, trimers, tetramers and the like. "Monomer" refers to any ethylenically or acetylenically unsaturated compound capable of being polymerized. Such monomers may contain one or more double or triple bonds.

The term "B-staged" refers to uncured dielectric matrix materials. By "uncured" is meant any dielectric material that can be polymerized or cured, such as by condensation, to form higher molecular weight materials, such as coatings or films. Such B-staged material may be monomeric, oligomeric or mixtures thereof. B-staged material is further intended to include mixtures of polymeric material with monomers, oligomers or a mixture of monomers and oligomers.

Particle sizes were determined using standard dynamic light scattering techniques. All correlation functions were converted to hydrodynamic sizes using LaPlace inversion methods, such as CONTIN. All amounts are percent by weight and all ratios are by weight, unless otherwise noted. All numerical ranges are inclusive and combinable in any order, except where it is obvious that such numerical ranges are constrained to add up to 100%.

It has been surprisingly found that polymer particles having a particle size of $\leq 100$ nm can be prepared by emulsion polymerization without the use of ionic surfactants. The emulsions of the present invention are formed using one or more nonionic surfactants, wherein at least one of the nonionic surfactants is an amine-N-oxide surfactant.

Thus, the present invention provides a process for preparing polymer particles including the step of: polymerizing one or more monomers in an aqueous emulsion including one or more surfactants, the one or more surfactants consisting of nonionic surfactants, wherein at least one of the nonionic surfactants is an amine-N-oxide surfactant, and wherein the polymer particles have a mean particle size of less than or equal to 100 nm.

The nonionic surfactants of the present invention include at least one amine-N-oxide surfactant. The amine oxides are nonionic surfactants obtained by oxidizing a tertiary amine to form the amine oxide. Amine oxide surfactants include the N-alkyl amine oxides such as N-cocadimethylamine oxide, N-lauryl dimethylamine oxide, N-myristyl dimethylamine oxide, and N-stearyl dimethylamine oxide; the N-acyl amine oxides such as N-cocamidopropyl dimethylamine oxide and N-tallowamidopropyl dimethylamine oxide; and N-alkoxyalkyl amine oxides such as bis(2-hydroxyethyl) $C_{12-15}$ alkoxypropylamine oxide. The hydrophobic portion of the amine oxide surfactants is generally provided by a fatty hydrocarbon chain containing from ten to twenty-one carbon atoms.

Exemplary amine oxide surfactants include, but are not limited to, lauric acid diethanolamide, N-lauryl dimethylamine oxide, coconut acid diethanolamide, myristic acid diethanolamide, and oleic acid diethanolamide. Suitable commercial materials are those products sold under tradenames and trademarks such as AMMONYX by the Stephan Company, Northfield, Ill.; BARLOX by Lonza Incorporated, Fairlawn, N.J.; and MACKAMINE by The McIntyre Group Limited, University Park, Ill. It will be appreciated by those skilled in the art that one or more anime-oxide surfactants may be used in the present invention. Typically, the anime-N-oxide surfactant is used in the present invention in an amount from 0.1 to 15% by weight, based on the total weight monomer and optional cross-linker, preferably from 1 to 12 wt %, and more preferably from 3 to 12 wt %.

A wide variety of nonionic surfactants may be used in combination with the amine-oxides. Suitable other nonionic surfactants include, but are not limited to, ethoxylated fatty alcohols, fatty acid alkanolamides, sorbitan derivatives, ethylene oxide/propylene oxide copolymers, and the like. Such other surfactants may be used in a wide variety of amounts, such as from 0.1 to 15% by weight, based on the total weight of monomers and optional cross-linker, and preferably from 2 to 12 wt %.

Fatty alcohol ethoxylates contain in their molecule the characteristic group—$(OCH_2CH_2)_aOH$, which is attached to a fatty hydrocarbon residue of about eight to twenty carbon atoms, such as lauryl ($C_{12}$), cetyl ($C_{16}$) and stearyl ($C_{18}$). The integer "a" can have a value of one to about one hundred, but typically has a value of about 12 to 40. Suitable fatty alcohol ethoxylates include, but are not limited to, the various polyoxyethylene fatty alcohols sold under the tradename BRiJ by ICI Americas Incorporated, of Wilmington, Del.; the tradename EMERY by the Henkel Corporation/Emery Group, of Ambler, Pa.; the trademark ETHOSPERSE by Lonza Incorporated, of Fairlawn, N.J.; and the trademark PROMULGEN by the Amerchol Corporation, of Edison, N.J. Other polyoxyethylene fatty alcohols which can be employed in accordance with the concepts of the present invention are polyoxyethylene (4) lauryl ether, polyoxyethylene (2) cetyl ether, polyoxyethylene (10) cetyl ether, polyoxyethylene (20) cetyl ether, polyoxyethylene (2) stearyl ether, polyoxyethylene (10) stearyl ether, polyoxyethylene (20) stearyl ether, polyoxyethylene (21) stearyl ether, polyoxyethylene (100) stearyl ether, polyoxyethylene (2) oleyl ether, polyoxyethylene (10) oleyl ether, and polyoxyethylene (20) oleyl ether. Other suitable nonionic surfactants which are either ethoxylated alcohols or ethoxylated alkyl phenols are sold under the trademarks TERGITOL and TRITON by Union Carbide Corporation, Danbury, Conn.; NEODOL by Shell Chemical Company, Houston, Tex.; MACOL by PPG Industries, Gurnee, Ill.; and under the tradenames TRYCOL by Henkel Corporation, Ambler, Pa.; and BRIJ by ICI Americas Incorporated, Wilmington, Del.

The fatty acid alkanolamides are nonionic surfactants obtained by reacting alkanolamines such as monoethanolamine, diethanolamine, monoisopropanolamine, or diisopropanolamine, with a fatty acid or fatty acid ester to form the amide. The hydrophobic portion of the nonionic surfactant is provided by a fatty acid hydrocarbon chain which generally has from ten to twenty-one carbon atoms. The fatty acid alkanolamide surfactants include fatty acid diethanolamides such as isostearic acid diethanolamide, lauric acid diethanolamide, capric acid diethanolamide, coconut fatty acid diethanolamide, linoleic acid diethanolamides, myristic acid diethanolamide, oleic acid diethanolamide, and stearic acid diethanolamide; fatty acid monoethanolamides such as coconut fatty acid monoethanolamide; and fatty acid monoisopropanolamides such as oleic acid monoisopropanolamide and lauric acid monoisopropanolamide. Representative of a such nonionic surfactant is a product sold under the trademark WITCAMIDE by Witco Corporation, New York, N.Y.

Suitable sorbitan derivatives are available under the tradenames SPAN and TWEEN by ICI Americas Incorporated, Wilmington, Del.; and suitable ethylene oxide/propylene oxide block copolymers are sold under the trademarks PLURONIC and TETRONIC by BASF Corporation, Parsippany, N.J.

The nonionic surfactants of the present invention, particularly the amine-oxide surfactants, are capable of producing extremely small emulsion droplets. Controlled polymerization of the monomers in these droplets produces small polymer particles, i.e. $\leq 100$ nm, and preferably extremely small polymer particles, i.e. $\leq 50$ nm in size. Emulsion polymers having other suitable particle sizes, such as $\leq 45$ nm, $\leq 40$ nm, $\leq 35$ nm, and $\leq 30$ nm, may be produced according to the present invention. Such polymer particles typically have a lower particle size of about 1 nm. Thus, the present polymer particles have a particle size range of from 1 to 100 nm, and preferably from 1 to 50 nm. The particle size polydispersity of these emulsion polymer particles is in the range 1.0001 to 10, more preferably 1.001 to 5, and most preferably 1.001 to 2.5.

A wide variety of monomers may suitably be used in the present invention. Suitable unsaturated monomers include, but are not limited to: (meth)acrylic acid, (meth) acrylamides, alkyl (meth)acrylates, alkenyl (meth)acrylates, aromatic (meth)acrylates, vinyl aromatic monomers, nitrogen-containing compounds and their thio-analogs, and substituted ethylene monomers. It will be appreciated by those skilled in the art that more than one monomer may suitable be employed.

Typically, the alkyl (meth)acrylates useful in the present invention are ($C_1$–$C_{24}$) alkyl (meth)acrylates. Suitable alkyl (meth)acrylates include, but are not limited to, "low cut" alkyl (meth)acrylates, "mid cut" alkyl (meth)acrylates and "high cut" alkyl (meth)acrylates.

"Low cut" alkyl (meth)acrylates are typically those where the alkyl group contains from 1 to 6 carbon atoms. Suitable low cut alkyl (meth)acrylates include, but are not limited to: methyl methacrylate ("MMA"), methyl acrylate, ethyl acrylate, propyl methacrylate, butyl methacrylate ("BMA"), butyl acrylate ("BA"), isobutyl methacrylate ("IBMA"), hexyl methacrylate, cyclohexyl methacrylate, cyclohexyl acrylate and mixtures thereof.

"Mid cut" alkyl (meth)acrylates are typically those where the alkyl group contains from 7 to 15 carbon atoms. Suitable mid cut alkyl (meth)acrylates include, but are not limited to: 2-ethylhexyl acrylate ("EHA"), 2-ethylhexyl methacrylate, octyl methacrylate, decyl methacrylate, isodecyl methacrylate ("IDMA", based on branched ($C_{10}$)alkyl isomer mixture), undecyl methacrylate, dodecyl methacrylate (also known as lauryl metharylate), tridecyl methacrylate, tetradecyl methacrylate (also known as myristyl methacrylate), pentadecyl methacrylate and mixtures thereof. Particularly useful mixtures include dodecyl-pentadecyl methacrylate ("DPMA"), a mixture of linear and branched isomers of dodecyl, tridecyl, tetradecyl and pentadecyl methacrylates; and lauryl-myristyl methacrylate ("LMA").

"High cut" alkyl (meth)acrylates are typically those where the alkyl group contains from 16 to 24 carbon atoms. Suitable high cut alkyl (meth)acrylates include, but are not limited to: hexadecyl methacrylate, heptadecyl methacrylate, octadecyl methacrylate, nonadecyl methacrylate, cosyl methacrylate, eicosyl methacrylate and mixtures thereof. Particularly useful mixtures of high cut alkyl (meth)acrylates include, but are not limited to: cetyl-eicosyl methacrylate ("CEMA"), which is a mixture of hexadecyl, octadecyl, cosyl and eicosyl methacrylate; and cetyl-stearyl methacrylate ("SMA"), which is a mixture of hexadecyl and octadecyl methacrylate.

The mid-cut and high-cut alkyl (meth)acrylate monomers described above are generally prepared by standard esterification procedures using technical grades of long chain aliphatic alcohols, and these commercially available alcohols are mixtures of alcohols of varying chain lengths containing between 10 and 15 or 16 and 20 carbon atoms in the alkyl group. Examples of these alcohols are the various Ziegler catalyzed ALFOL alcohols from Vista Chemical company, i.e., ALFOL 1618 and ALFOL 1620, Ziegler catalyzed various NEODOL alcohols from Shell Chemical Company, i.e. NEODOL 25L, and naturally derived alcohols such as Proctor & Gamble's TA-1618 and CO-1270. Consequently, for the purposes of this invention, alkyl (meth)acrylate is intended to include not only the individual alkyl (meth)acrylate product named, but also to include mixtures of the alkyl (meth)acrylates with a predominant amount of the particular alkyl (meth)acrylate named.

The alkyl (meth)acrylate monomers useful in the present invention may be a single monomer or a mixture having different numbers of carbon atoms in the alkyl portion. Also, the (meth)acrylamide and alkyl (meth)acrylate monomers useful in the present invention may optionally be substituted. Suitable optionally substituted (meth)acrylamide and alkyl (meth)acrylate monomers include, but are not limited to: hydroxy ($C_2$–$C_6$)alkyl (meth)acrylates, dialkylamino ($C_2$–$C_6$)-alkyl (meth)acrylates, dialkylamino($C_2$–$C_6$)alkyl (meth)acrylamides.

Particularly useful substituted alkyl (meth)acrylate monomers are those with one or more hydroxyl groups in the alkyl radical, especially those where the hydroxyl group is found at the β-position (2-position) in the alkyl radical. Hydroxyalkyl (meth)acrylate monomers in which the substituted alkyl group is a ($C_2$–$C_6$)alkyl, branched or unbranched, are preferred. Suitable hydroxyalkyl (meth)acrylate monomers include, but are not limited to: 2-hydroxyethyl methacrylate ("HEMA"), 2-hydroxyethyl acrylate ("HEA"), 2-hydroxypropyl methacrylate, 1-methyl-2-hydroxyethyl methacrylate, 2-hydroxy-propyl acrylate, 1-methyl-2-hydroxyethyl acrylate, 2-hydroxybutyl methacrylate, 2-hydroxybutyl acrylate and mixtures thereof. The preferred hydroxyalkyl (meth)acrylate monomers are HEMA, 1-methyl-2-hydroxyethyl methacrylate, 2-hydroxypropyl methacrylate and mixtures thereof. A mixture of the latter two monomers is commonly referred to as "hydroxypropyl methacrylate" or "HPMA."

Other substituted (meth)acrylate and (meth)acrylamide monomers useful in the present invention are those with a dialkylamino group or dialkylaminoalkyl group in the alkyl radical. Examples of such substituted (meth)acrylates and (meth)acrylamides include, but are not limited to: dimethylaminoethyl methacrylate, dimethylaminoethyl acrylate, N,N-dimethylaminoethyl methacrylamide, N,N-dimethylaminopropyl methacrylamide, N,N-dimethylaminobutyl methacrylamide, N,N-di-ethylaminoethyl methacrylamide, N,N-diethylaminopropyl methacrylamide, N,N-diethylaminobutyl methacrylamide, N-(1,1-dimethyl-3-oxobutyl) acrylamide, N-(1,3-diphenyl-1-ethyl-3-oxobutyl) acrylamide, N-(1-methyl-1-phenyl-3-oxobutyl) methacrylamide, and 2-hydroxyethyl acrylamide, N-methacrylamide of aminoethyl ethylene urea, N-methacryloxy ethyl morpholine, N-maleimide of dimethylaminopropylamine and mixtures thereof.

Other substituted (meth)acrylate monomers useful in the present invention are silicon-containing monomers such as γ-propyl tri($C_1$–$C_6$)alkoxysilyl (meth)acrylate, γ-propyl tri($C_1$–$C_6$)alkylsilyl (meth)acrylate, γ-propyl di($C_1$–$C_6$)alkoxy ($C_1$–$C_6$)alkylsilyl (meth)acrylate, γ-propyl di($C_1$–$C_6$)alkyl ($C_1$–$C_6$)alkoxysilyl (meth)acrylate, vinyl tri($C_1$–$C_6$) alkoxysilyl (meth)acrylate, vinyl di($C_1$–$C_6$)alkoxy($C_1$–$C_6$) alkylsilyl (meth)acrylate, vinyl ($C_1$–$C_6$)alkoxydi($C_1$–$C_6$) alkylsilyl (meth)acrylate, vinyl tri($C_1$–$C_6$)alkylsilyl (meth) acrylate, and mixtures thereof.

The vinylaromatic monomers useful as unsaturated monomers in the present invention include, but are not limited to: styrene ("STY"), α-methylstyrene, vinyltoluene, p-methylstyrene, ethylvinylbenzene, vinylnaphthalene, vinylxylenes, and mixtures thereof. The vinylaromatic monomers also include their corresponding substituted counterparts, such as halogenated derivatives, i.e., containing one or more halogen groups, such as fluorine, chlorine or bromine; and nitro, cyano, ($C_1$–$C_{10}$)alkoxy, halo($C_1$–$C_{10}$) alkyl, carb($C_1$–$C_{10}$)alkoxy, carboxy, amino, ($C_1$–$C_{10}$) alkylamino derivatives and the like.

The nitrogen-containing compounds and their thio-analogs useful as unsaturated monomers in the present invention include, but are not limited to: vinylpyridines such as 2-vinylpyridine or 4-vinylpyridine; lower alkyl ($C_1$–$C_8$) substituted N-vinyl pyridines such as 2-methyl-5-vinyl-pyridine, 2-ethyl-5-vinylpyridine, 3-methyl-5-vinylpyridine, 2,3-dimethyl-5-vinyl-pyridine, and 2-methyl-3-ethyl-5-vinylpyridine; methyl-substituted quinolines and isoquinolines; N-vinylcaprolactam; N-vinylbutyrolactam; N-vinylpyrrolidone; vinyl imidazole; N-vinyl carbazole; N-vinyl-succinimide; (meth)acrylonitrile; o-, m-, or p-aminostyrene; maleimide; N-vinyl-oxazolidone; N,N-dimethyl aminoethyl-vinyl-ether; ethyl-2-cyano acrylate; vinyl acetonitrile; N-vinylphthalimide; N-vinyl-pyrrolidones such as N-vinyl-thio-pyrrolidone, 3 methyl-1-vinyl-pyrrolidone, 4-methyl-1-vinyl-pyrrolidone, 5-methyl-1-vinyl-pyrrolidone, 3-ethyl-1-vinyl-pyrrolidone, 3-butyl-1-vinyl-pyrrolidone, 3,3-dimethyl-1-vinyl-pyrrolidone, 4,5-dimethyl-1-vinyl-pyrrolidone, 5,5-dimethyl-1-vinyl-pyrrolidone, 3,3,5-trimethyl-1-vinyl-pyrrolidone, 4-ethyl-1-vinyl-pyrrolidone, 5-methyl-5-ethyl-1-vinyl-pyrrolidone and 3,4,5-trimethyl-1-vinyl-pyrrolidone; vinyl pyrroles; vinyl anilines; and vinyl piperidines.

The substituted ethylene monomers useful as unsaturated monomers is in the present invention include, but are not limited to: allylic monomers, vinyl acetate, vinyl formamide, vinyl chloride, vinyl fluoride, vinyl bromide, vinylidene chloride, vinylidene fluoride and vinylidene bromide.

The emulsion polymers of the present invention may optionally be cross-linked, and preferably are cross-linked. Such cross-linked polymer particles are particularly useful as porogens in the manufacture of porous dielectric materials. Any amount of cross-linker is suitable for use in the present invention. Typically, the polymers of the present invention contain at least 1% by weight, based on the total weight of the polymer. Up to and including 100% cross-linking agent, based on the weight of the polymer, may be effectively used in the particles of the present invention. It is preferred that the amount of cross-linker is from about 1% to about 80%, and more preferably from about 1% to about 60%.

Suitable cross-linkers useful in the present invention include di-, tri-, tetra-, or higher multi-functional ethylenically unsaturated monomers. Examples of cross-linkers useful in the present invention include, but are not limited to: trivinylbenzene, divinyltoluene, divinylpyridine, divinylnaphthalene and divinylxylene; and such as ethyleneglycol diacrylate, trimethylolpropane triacrylate, diethyleneglycol divinyl ether, trivinylcyclohexane, allyl methacrylate ("ALMA"), ethyleneglycol dimethacrylate ("EGDMA"), diethyleneglycol dimethacrylate ("DEGDMA"), propyleneglycol dimethacrylate, propyleneglycol diacrylate, trimethylolpropane trimethacrylate ("TMPTMA"), divinyl benzene ("DVB"), glycidyl methacrylate, 2,2-dimethylpropane 1,3 diacrylate, 1,3-butylene glycol diacrylate, 1,3-butylene glycol dimethacrylate, 1,4-butanediol diacrylate, diethylene glycol diacrylate, diethylene glycol dimethacrylate, 1,6-hexanediol diacrylate, 1,6-hexanediol dimethacrylate, tripropylene glycol diacrylate, triethylene glycol dimethacrylate, tetraethylene glycol diacrylate, polyethylene glycol 200 diacrylate, tetraethylene glycol dimethacrylate, polyethylene glycol dimethacrylate, ethoxylated bisphenol A diacrylate, ethoxylated bisphenol A dimethacrylate, polyethylene glycol 600 dimethacrylate, poly(butanediol) diacrylate, pentaerythritol triacrylate, trimethylolpropane triethoxy triacrylate, glyceryl propoxy triacrylate, pentaerythritol tetraacrylate, pentaerythritol tetramethacrylate, dipentaerythritol monohydroxypentaacrylate, divinyl silane,. trivinyl silane, dimethyl divinyl silane, divinyl methyl silane, methyl trivinyl silane, diphenyl divinyl silane, divinyl phenyl silane, trivinyl phenyl silane, divinyl methyl phenyl silane, tetravinyl silane, dimethyl vinyl disiloxane, poly(methyl vinyl siloxane), poly(vinyl hydro siloxane), poly (phenyl vinyl siloxane) and mixtures thereof.

Particularly suitable monomers for use in the present invention include silyl containing monomers or poly (alkylene oxide) monomers. Such silyl containing monomers or poly(alkylene oxide) monomers may be used to form the uncrosslinked polymer, used as the crosslinker, or both. Any monomer containing silicon may be useful as the silyl containing monomers in the present invention. The silicon moiety in such silyl containing monomers may be reactive or unreactive. Exemplary "reactive" silyl containing monomers include those containing one or more alkoxy or acetoxy groups, such as, but not limited to, trimethoxysilyl containing monomers, triethoxysilyl containing monomers, methyl dimethoxysilyl containing monomers, and the like. Exemplary "unreactive" silyl containing monomers include those containing alkyl groups, aryl groups, alkenyl groups or mixtures thereof, such as but are not limited to, trimethylsilyl containing monomers, triethylsilyl containing monomers, phenyldimethylsilyl containing monomers, and the like. Polymeric porogens including silyl containing monomers as polymerized units are intended to include such porogens prepared by the polymerization of a monomer containing a silyl moiety. It is not intended to include a linear polymer that contains a silyl moiety only as end capping units. It is preferred that the silyl containing monomer is not a siloxane. It is further preferred that the present aqueous emulsion is free of siloxane monomer.

Suitable silyl containing monomers include, but are not limited to, vinyltrimethylsilane, vinyltriethylsilane, vinyltrimethoxysilane, vinyltriethoxysilane, γ-trimethoxysilylpropyl (meth)acrylate, divinylsilane, trivinylsilane, dimethyldivinylsilane, divinylmethylsilane, methyltrivinylsilane, diphenyldivinylsilane, divinylphenylsilane, trivinylphenylsilane, divinylmethylphenylsilane, tetravinylsilane, allyloxy-tert-butyldimethylsilane, allyloxytrimethylsilane, allyltriethoxysilane, allyltri-iso-propylsilane, allyltrimethoxysilane, allyltrimethylsilane, allyltriphenylsilane, diethoxy methylvinylsilane, diethyl methylvinylsilane, dimethyl ethoxyvinylsilane, dimethyl phenylvinylsilane, ethoxy diphenylvinylsilane, methyl bis(trimethylsilyloxy)vinylsilane, triacetoxyvinylsilane, triethoxyvinylsilane, triethylvinylsilane, triphenylvinylsilane, tris(trimethylsilyloxy)vinylsilane, vinyloxytrimethylsilane and mixtures thereof.

The amount of silyl containing monomer useful to form the particles of the present invention is typically from about 1 to about 99% wt, based on the total weight of the monomers used. It is preferred that the silyl containing monomers are present in an amount of from 1 to about 80% wt, and more preferably from about 5 to about 75% wt.

Suitable poly(alkylene oxide) monomers include, but are not limited to, poly(propylene oxide) monomers, poly(ethylene oxide) monomers, poly(ethylene oxide/propylene oxide) monomers, poly(propylene glycol) (meth)acrylates, poly(propylene glycol) alkyl ether (meth)acrylates, poly(propylene glycol) phenyl ether (meth)acrylates, poly(propylene glycol) 4-nonylphenol ether (meth)acrylates, poly(ethylene glycol) (meth)acrylates, poly(ethylene glycol) alkyl ether (meth)acrylates, poly(ethylene glycol) phenyl ether (meth)acrylates, poly(propylene/ethylene glycol) alkyl ether (meth)acrylates and mixtures thereof. Preferred poly(alkylene oxide) monomers include trimethoylolpropane ethoxylate tri(meth)acrylate, trimethoylolpropane propoxylate tri(meth)acrylate, poly(propylene glycol) methyl ether acrylate, and the like. Particularly suitable poly(propylene glycol) methyl ether acrylate monomers are those having a molecular weight in the range of from about 200 to about 2000. The poly(ethylene oxide/propylene oxide) monomers useful in the present invention may be linear, block or graft copolymers. Such monomers typically have a degree of polymerization of from about 1 to about 50, and preferably from about 2 to about 50.

Typically, the amount of poly(alkylene oxide) monomers useful in the particles of the present invention is from about 1 to about 99% wt, based on the total weight of the monomers used. The amount of poly(alkylene oxide) monomers is preferably from about 2 to about 90% wt, and more preferably from about 5 to about 80% wt.

The emulsion polymers useful in the present invention are generally prepared by first charging water and some portion of the monomer emulsion to a reaction vessel equipped with a stirrer, a thermometer and a reflux condenser. Typically, the monomer emulsion is composed of monomer, surfactant, initiator and chain transfer agent, as appropriate. The initial charge of monomer emulsion is heated with stirring under a nitrogen blanket to a temperature of from about 55° C. to about 125° C. After the seed charge has reached a temperature sufficient to initiate polymerization, the monomer emulsion or balance of the monomer emulsion is charged to the reaction vessel over a period of 15 minutes to 4 hours while maintaining the reaction at the desired reaction temperature. After completing the monomer emulsion addition, a series of additional aliquots of initiator in water are charged to the reaction. Typically the initiator is charged to the reaction and followed by a hold period to allow for reaction to occur before adding the next initiator amount. Typically three initiator additions are used. After the final initiator amount is added, the batch is held for 30 minutes to 4 hours to fully decompose all initiator and drive the reaction to completeness.

In the alternative, the emulsion polymerization may be carried out in a batch process. In such a batch process, the emulsion polymers are prepared by charging water, monomer, surfactant, initiator and chain transfer agent, as appropriate, to a reaction vessel with stirring under a nitrogen blanket. The monomer emulsion is heated to a temperature of from about 55° C. to about 125° C. to carry out the polymerization. After 30 minutes to 4 hours at this temperature, a series of additional aliquots of initiator are charged to the reaction vessel. Typically the initiator is charged to the reaction vessel followed by a hold period to allow for reaction to occur before adding the next amount of initiator. Typically three initiator additions are used. After the final initiator amount is added, the batch is held for 30 minutes to 4 hours to fully decompose all initiator and drive the reaction to completeness.

It is preferred that the polymers of the present invention are prepared using anionic polymerization or free radical polymerization techniques. Initiators useful in the free radical polymerization of porogens of the present invention include, but are not limited to, one or more of: peroxyesters, dialkylperoxides, alkylhydroperoxides, persulfates, azoinitiators, redox initiators and the like. Particularly useful free radical initiators include, but are not limited to: benzoyl peroxide, t-butyl peroctoate, t-amyl peroxypivalate, cumene hydroperoxide, and azo compounds such as azoisobutylnitrile and 2,2'-azobis (2-methylbutanenitrile). When such free radical initiators are used, part of the initiator is incorporated into the polymer as end groups. The amount of the free radical initiator used is typically from 0.05 to 10% by weight, based on the weight of total monomer.

Chain transfer reagents may optionally be used to prepare the polymers useful in the present invention. Suitable chain transfer agents include, but are not limited to: alkyl mercaptans such as dodecyl mercaptan, and aromatic hydrocarbons with activated hydrogens such as toluene. When the porous dielectric material of the present invention is used in a semiconductor, it is preferred that the optional chain transfer agent is not a sulfur-containing chain transfer agent.

The present polymer particles have the advantage over conventionally produced emulsion polymer particles in that they have a much lower level of ions in solution. Preferably, the present polymer particles are substantially free of ionic impurities, including ionic surfactants. Such polymer particles being substantially free of ionic impurities are particularly suitable for use in electronic applications. The present invention thus reduces or eliminates the need to carry out subsequent purification steps of the polymer particles, such as dialysis or ultra-filtration, to remove the unwanted ionic impurities. In addition, the use of nonionic surfactants allows for easier transfer of the particles into organic solvents. This is often required to use the particles as the materials, such as B-staged dielectric materials, into which they will be subsequently dispersed are soluble primarily in organic solvents such as alcohols, amides, esters, ethers, ketones, aromatic or aliphatic hydrocarbons and the like.

Thus, the present invention provides an emulsion of polymer particles including one or more surfactants, the one or more surfactants consisting of nonionic surfactants, wherein at least one of the nonionic surfactants is an amine-N-oxide surfactant, and wherein the polymer particles have a mean particle size of less than or equal to 100 nm. The present invention further provides an emulsion of polymer particles including one or more surfactants, wherein the polymer particles have a mean particle size of less than or equal to 100 nm, and wherein the emulsion is substantially free of ionic surfactants.

The present polymer particles can be redispersed in an organic solvent by a number of techniques known to those skilled in the art including but not limited to freeze-drying, spray drying, solvent exchange, dialysis, and azeotropic distillation.

It was surprisingly found that nonionic surfactants alone, wherein at least one nonionic surfactant is an amine-oxide surfactant, are capable of producing polymer particles having small particle sizes.

The polymer particles of the present invention are suitable for a variety of uses. Suitable uses are any where conventional emulsion polymer particles are used, such as in coatings such as paints, varnishes, and the like; adhesives; construction products such as mastics, caulks, sealants, and the like; polishes; waxes; electronic applications such as in photoresists, plating resists, soldermasks, antireflective coatings, and as porogens for use in forming porous materials; and optoelectronic applications such as coatings, films, and for attenuating the refractive index of materials such as waveguides, optical switches, and the like.

The emulsion polymer particles of the present invention are useful as porogens in reducing the dielectric constant of dielectric materials, particularly low dielectric constant ("k") materials. A low k dielectric material is any material having a dielectric constant less than 4. Suitable dielectric materials useful in the present invention include, but are not limited to: inorganic matrix materials such as carbides, oxides, nitrides and oxyfluorides of silicon, boron, or aluminum; silicones; siloxanes, such as silsesquioxanes; silicates; silazanes; and organic matrix materials such as benzocyclobutenes, poly(aryl esters), poly(ether ketones), polycarbonates, polyimides, fluorinated polyimides, polynorbornenes, poly(arylene ethers), polyaromatic hydrocarbons, such as polynaphthalene, polyquinoxalines, poly(perfluorinated hydrocarbons) such as poly (tetrafluoroethylene), and polybenzoxazoles. Particularly suitable dielectric materials are available under the tradenames TEFLON, AVATREL, BCB, AEROGEL, XEROGEL, PARYLENE F, and PARYLENE N. Suitable silsesquioxane compositions include, but are not limited to hydrogen silsesquioxane, alkyl silsesquioxane such as methyl silsesquioxane, aryl silsesquioxane such as phenyl silsesquioxane, and mixtures thereof, such as alkyl/hydrogen, aryl/hydrogen or alkyl/aryl silsesquioxane. It is preferred that the dielectric material is a silsesquioxane and more preferably hydrogen silsesquioxane, methyl silsesquioxane, phenyl silsesquioxane, a mixture of dielectric materials containing hydrogen silsesquioxane as a predominant component, or mixtures thereof. Such dielectric materials are commercially available or may be prepared by known methods. For example the preparation of hydrogen silsesquioxanes is disclosed in U.S. Pat. No. 3,615,272. Typically, the silsesquioxanes useful in the present invention are used as oligomeric materials, generally having from 8 to 20 repeating units.

Preferred dielectric materials are B-staged organo polysilica materials. By B-staged organo polysilica (or organo siloxane) is meant a compound including silicon, carbon, oxygen and hydrogen atoms and having the formula:

$$((RR^1SiO)_a(R^2SiO_{1.5})_b(R^3SiO_{1.5})_c(SiO_2)_d)_n$$

wherein R, $R^1$, $R^2$ and $R^3$ are independently selected from hydrogen, $(C_1-C_6)$alkyl, aryl, and substituted aryl; a, c and d are independently a number from 0 to 1; b is a number from 0.2 to 1; n is integer from about 3 to about 10,000; provided that a+b+c+d=1; and provided that at least one of R, $R^1$ and $R^2$ is not hydrogen. "Substituted aryl" refers to an aryl group having one or more of its hydrogens replaced by another substituent group, such as cyano, hydroxy, mercapto, halo, $(C_1-C_6)$alkyl, $(C_1-C_6)$alkoxy, and the like. In the above formula, a, b, c and d represent the mole ratios of each component. Such mole ratios can be varied between 0 and about 1. It is preferred that a is from 0 to about 0.8. It is also preferred that c is from 0 to about 0.8. It is further preferred that d is from 0 to about 0.8. In the above formula, n refers to the number of repeat units in the B-staged material. Preferably, n is an integer from about 3 to about 1000. It will be appreciated that prior to any curing step, the B-staged organo polysilica dielectric matrix materials may include one or more of hydroxyl or alkoxy end capping or side chain functional groups. Such end capping or side chain functional groups are known to those skilled in the art.

When used as porogens, the present polymer particles may be directly added to a B-staged dielectric matrix material as is or may be first purified to remove impurities that might affect the electrical or physical properties of electronic devices. Purification of the porogen particles may be accomplished either by precipitation of the porogen particles or adsorption of the impurities. It will be appreciated by those skilled in the art that by preparing the present polymer particles in nonionic surfactants, the amount of ionic impurities to be removed is greatly reduced. The present emulsion particles when used as porogens typically have a weight average molecular weight in the range of 1000 to 10,000,000, preferably 100,000 to 5,000,000, and more preferably 100,000 to 1,000,000.

In preparing the dielectric matrix materials of the present invention, the porogens are first dispersed within, or dissolved in, a B-staged dielectric material. Any amount of porogen may be combined with the B-staged dielectric materials according to the present invention. The amount of porogen used will depend on the particular porogen employed, the particular B-staged dielectric material employed, and the extent of dielectric constant reduction desired in the resulting porous dielectric material. Typically, the amount of porogen used is in the range of from 1 to 90 wt %, based on the weight of the B-staged dielectric material, preferably from 10 to 80 wt %, more preferably from 15 to 60 wt %, and even more preferably from 20 to 30 wt %. Typically, the B-staged matrix material is first dissolved in a suitable high boiling solvent, such as methyl isobutyl ketone, diisobutyl ketone, 2-heptanone, γ-butyrolactone, γ-caprolactone, ethyl lactate propyleneglycol monomethyl ether acetate, propyleneglycol monomethyl ether, diphenyl ether, anisole, n-amyl acetate, n-butyl acetate, cyclohexanone, N-methyl-2-pyrrolidone, N,N'-dimethylpropyleneurea, mesitylene, xylenes, or mixtures thereof to form a solution. The porogen particles are then dispersed or dissolved within the solution. The resulting dispersion is then deposited on a substrate by methods known in the art, such as spin coating, spray coating or doctor blading, to form a film or layer. Thus, the present invention still further provides a composition including a B-staged dielectric material and an emulsion polymeric porogen particle wherein the polymer particles have a mean particle size of less than or equal to 100 nm, and wherein the polymer particles are substantially free of ionic surfactants. Preferably, the emulsion polymeric porogen particle includes one or more amine-N-oxide surfactants.

After being deposited on a substrate, the B-staged dielectric material is then substantially cured to form a rigid, cross-linked dielectric matrix material without substantially removing the porogen particle. Such curing may be by any means known in the art including, but not limited to, heating to induce condensation or e-beam irradiation to facilitate free radical coupling of the oligomer or monomer units.

Once the B-staged dielectric material is cured, the film is subjected to conditions which remove the porogen without substantially degrading the dielectric matrix material, that is, less than 5% by weight of the dielectric matrix material is lost. Typically, such conditions include exposing the film to heat and/or radiation and are within the ability of one skilled in the art. Upon removal, the porogen polymer depolymerizes or otherwise breaks down into volatile components or fragments which are then removed from, or migrate out of, the dielectric matrix material yielding pores or voids, which fill up with the carrier gas used in the process. Thus, a porous dielectric material having voids is obtained, where the size of the voids is substantially the same as the particle size of the porogen. The resulting dielectric material having voids thus has a lower dielectric constant than such material without such voids.

The present emulsion particles may also be post-functionalized. Such post-functionalization may be advantageous, such as in further compatiblizing the porogen with the dielectric material and may be by any techniques known in the art. It is preferred that when the polymer particles of the present invention are used as porogens, that they are substantially compatible with the dielectric material.

In general, the emulsion polymers of the present invention useful as porogens must be dispersible, miscible or otherwise substantially compatible with the host dielectric matrix material in solution and in the thin film. Preferably, the porogen must be present within this solution as substantially discrete, substantially non-aggregated or substantially non-agglomerated particles in order to achieve the desired benefit of this invention, namely substantially uniformly dispersed pores with a size comparable to that of the porogen's size. This is accomplished by modifying the porogen composition such that it is "compatible" with the host dielectric matrix material. Such compatibilization is described in copending U.S. Pat. App. Ser. No. 09/460,326 (Allen et al.).

In a further embodiment, the present invention provides a method of manufacturing an electronic device including the steps of: a) depositing on a substrate a layer of a composition including B-staged dielectric material having a plurality of emulsion polymeric porogen particles dispersed therein, wherein the porogen particles have a mean particle size of less than or equal to 1100 nm, and wherein the porogen particles are substantially free of ionic surfactants; b) curing the B-staged dielectric material to form a dielectric matrix material without substantially removing the porogen particles; c) subjecting the dielectric matrix material to conditions which at least partially remove the porogen particles to form a porous dielectric material layer without substantially degrading the dielectric material; d) patterning the dielectric layer; e) depositing a metallic film onto the patterned dielectric layer; and f) planarizing the film to form an electronic device. Preferably, the porogen is substantially compatible with the B-staged dielectric material.

The porous dielectric material may be lithographically patterned by a variety of means known in the art, such as by using photoresists. Such patterning typically forms vias and/or trenches in subsequent processing steps. The trenches generally extend to the substrate and connect to at least one metallic via. Typically, lithographic patterning involves (i) coating the dielectric material layer with a positive or negative photoresist, such as those marketed by Shipley Company (Marlborough, Mass.); (ii) imagewise exposing, through a mask, the photoresist to radiation, such as light of appropriate wavelength or e-beam; (iii) developing the image in the resist, e.g., with a suitable developer; and (iv) transferring the image through the dielectric layer to the substrate with a suitable transfer technique such as reactive ion beam etching. Optionally, an antireflective composition may be disposed on the dielectric material prior to the photoresist coating. Such lithographic patterning techniques are well known to those skilled in the art.

A metallic film is then deposited onto the patterned dielectric layer to fill the trenches. Preferred metallic materials include, but are not limited to: copper, tungsten, gold, silver, aluminum or alloys thereof. The metal is typically deposited onto the patterned dielectric layer by techniques well known to those skilled in the art. Such techniques include, but are not limited to: chemical vapor deposition ("CVD"), plasma-enhanced CVD, combustion CVD ("CCVD"), electro and electroless deposition, sputtering, or the like. Optionally, a metallic liner, such as a layer of nickel, tantalum, titanium, tungsten, or chromium, including nitrides or silicides thereof, or other layers such as barrier or adhesion layers, e.g. silicon nitride or titanium nitride, is deposited on the patterned and etched dielectric material.

Excess metallic material is removed, e.g. by planarizing the metallic film, so that the resulting metallic material is generally level with the patterned dielectric layer. Planarization is typically accomplished with chemical/mechanical polishing or selective wet or dry etching. Such planarization methods are well known to those skilled in the art.

It will be appreciated by those skilled in the art that multiple layers of dielectric material, including multiple layers of porous dielectric material, and metal layers may subsequently be applied by repeating the above steps. It will be further appreciated by those skilled in the art that the compositions of the present invention are useful in any and all methods of integrated circuit manufacture.

The following examples are presented to illustrate further various aspects of the present invention, but are not intended to limit the scope of the invention in any aspect.

EXAMPLE 1 (COMPARATIVE)

A plurality of emulsion polymer particles was prepared by a gradual-add polymerization process. A monomer emulsion was made from a mixture of 100 g water, 1.60 g of 28% w/w solids SLS, 50.7 g styrene ("STY") and 16.9 g divinyl benzene ("DVB"). A reaction kettle containing 445 g water, 22.2 g of 28% w/w solids SLS and 0.37 g ammonium persulfate was heated to 85° C. under a nitrogen atmosphere. The monomer emulsion was fed to the kettle over 90 minutes. The reaction was held at 85° C. for 30 minutes after the end of the feed, and then cooled to 65° C. After cooling, 1.33 g of 10% iron sulfate (FeSO$_4$) was added. After 1 minute, 0.2 g of 70% tert-butyl hydroperoxide ("t-BHP") was added and after 2 minutes 0.10 g of 100% isoascorbic acid ("IAA") and the reaction held for 15 minutes. A second chaser system was added in the same sequence and over the same time period. The reaction was then cooled to ambient temperature and filtered through a 400 mesh sieve. The mean particle size of this sample (Comparative C-1) was determined to be 22 nm.

EXAMPLES 2–4 (COMPARATIVE)

The procedures of Example 1 were repeated, except that the amount of STY, DVB, and surfactant level were changed. Also, Comparatives C-3 and C-4 contained a second monomer. The particular components and their amounts are reported in the Table. Also reported are the mean particle sizes for these samples.

TABLE

| Sample | STY (wt %) | DVB (wt %) | Additional Monomer | Surfactant (wt %) | Mean Particle Size (nm) |
|---|---|---|---|---|---|
| C-2 | 82 | 18 | — | SLS (5 wt %) | 34 |
| C-3 | 72 | 18 | A-MSTY (10 wt %) | ALS (5 wt %) | 39 |
| C-4 | 12 | 18 | MMA | ALS (10 wt %) | 22 |

EXAMPLE 5

A plurality of emulsion polymer particles was prepared by a gradual-add polymerization process. A monomer emulsion was made from a mixture of 100 g water, 1.60 g of 28% w/w solids lauryldimethylamine-N-oxide, 55.1 g styrene and 12.5 g divinyl benzene. A reaction kettle containing 445 g water, 10.3 g of 28% w/w solids lauryldimethylamine-N-oxide (ca. 5 wt %) and 0.37 g ammonium persulfate was heated to 85° C. under a nitrogen atmosphere. The monomer emulsion was fed to the kettle over 90 minutes. The reaction was held at 85° C. for 30 minutes after the end of the feed, and then cooled to 65° C. After cooling, 1.33 g of 10% iron sulfate (FeSO$_4$) was added. After 1 minute, 0.2 g of 70% t-BHP was added and after 2 minutes 0.10 g of 100% isoascorbic acid ("IAA") and the reaction held for 15 minutes. A second chaser system was added in the same sequence and over the same time period. The reaction was then cooled to ambient temperature and filtered through a 400 mesh sieve. The mean particle size of the emulsion particles was determined to be 39 nm. Thus, the use of a nonionic amine-oxide surfactant produced emulsion particles having an extremely small mean particle size.

EXAMPLE 6

A plurality of emulsion polymer particles was prepared by a gradual-add polymerization process. A monomer emulsion was made from a mixture of 100 g water, 1.60 g of 28% w/w solids lauryldimethylamine-N-oxide, 55.1 g styrene and 12.5 g divinyl benzene. A reaction kettle containing 445 g water, 22.2 g of 28% w/w solids lauryldimethylamine-N-oxide (ca. 10 wt %) and 0.37 g ammonium persulfate was heated to 85° C. under a nitrogen atmosphere. The monomer emulsion was fed to the kettle over 90 minutes. The reaction was held at 85° C. for 30 minutes after the end of the feed, and then cooled to 65° C. After cooling, 1.33 g of 10% iron sulfate (FeSO$_4$) was added. After 1 minute, 0.2 g of 70% t-BHP was added and after 2 minutes 0.10 g of 100% isoascorbic acid ("IAA") and the reaction held for 15 minutes. A second chaser system was added in the same sequence and over the same time period. The reaction was then cooled to ambient temperature and filtered through a 400 mesh sieve. The mean particle size of the emulsion particles was determined to be 22 nm. Thus, the use of a nonionic amine-oxide surfactant produced emulsion particles having an extremely small mean particle size.

What is claimed is:

1. A process for preparing polymer particles comprising the step of:

polymerizing one or more monomers in an aqueous emulsion comprising one or more surfactants, the one or more surfactants consisting of nonionic surfactants, wherein at least one of the nonionic surfactants is an amine-N-oxide surfactant, and wherein the polymer particles have a mean particle size of less than or equal to 100 nm.

2. The process of claim 1 wherein the amine-N-oxide surfactant is chosen from N-alkyl amine oxides, N-acyl amine oxides and N-alkoxyalkyl amine oxides.

3. The process of claim 2 wherein the amine-N-oxide is chosen from N-cocodimethylamine oxide, N-lauryl dimethylamine oxide, N-myristyl dimethylamine oxide, N-stearyl dimethylamine oxide; N-cocamidopropyl dimethylamine oxide, N-tallowamidopropyl dimethylamine oxide, and bis(2-hydroxyethyl) C$_{12-15}$ alkoxypropylamine oxide.

4. The process of claim 3 wherein the bis(2-hydroxyethyl) C$_{12-15}$ alkoxypropylamine oxide is chosen from lauric acid diethanolamide, coconut acid diethanolamide, myristic acid diethanolamide, and oleic acid diethanolamide.

5. The process of claim 1 further comprising one or more nonionic surfactants chosen from ethoxylated fatty alcohols, fatty acid alkanolamides, sorbitan derivatives and ethylene oxide/propylene oxide copolymers.

6. The process of claim 1 wherein the mean particle size is less than or equal to 50 nm.

7. The process of claim 1 wherein the anime-N-oxide surfactant is present in an amount from 0.1 to 15% by weight, based on the total weight of the composition.

8. The process of claim 1 wherein at least one monomer is chosen from silyl containing monomers and poly(alkylene oxide) monomers.

9. The process of claim 1 further comprising one or more cross-linking agents.

10. The process of claim 1 wherein the emulsion is free of siloxane monomers.

* * * * *